United States Patent
Wu et al.

(10) Patent No.: US 11,724,296 B2
(45) Date of Patent: Aug. 15, 2023

(54) SIDE SPRAY METHOD FOR COOLING THE STEEL STRIP AFTER HOT ROLLING

(71) Applicant: BAOSHAN IRON & STEEL CO., LTD., Shanghai (CN)

(72) Inventors: Jianfeng Wu, Shanghai (CN); Xiaobo Wang, Shanghai (CN); Zhaohui Hu, Shanghai (CN); Yong Zhang, Shanghai (CN); Wendong Liu, Shanghai (CN); Qingfeng Zhang, Shanghai (CN); Ye Liu, Shanghai (CN); Guohua Xu, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 484 days.

(21) Appl. No.: 16/970,508

(22) PCT Filed: Mar. 22, 2019

(86) PCT No.: PCT/CN2019/079325
§ 371 (c)(1),
(2) Date: Aug. 17, 2020

(87) PCT Pub. No.: WO2019/184831
PCT Pub. Date: Oct. 3, 2019

(65) Prior Publication Data
US 2021/0078061 A1    Mar. 18, 2021

(30) Foreign Application Priority Data
Mar. 30, 2018 (CN) .......................... 201810298000.2

(51) Int. Cl.
*B21B 45/02* (2006.01)
*C21D 9/573* (2006.01)
(Continued)

(52) U.S. Cl.
CPC ...... *B21B 45/0218* (2013.01); *B21B 45/0233* (2013.01); *C21D 1/667* (2013.01);
(Continued)

(58) Field of Classification Search
CPC .. B21B 45/0233; C21D 1/667; C21D 8/0263; C21D 9/573
See application file for complete search history.

(56) References Cited

U.S. PATENT DOCUMENTS

2021/0078061 A1* 3/2021 Wu ........................ C21D 9/573

FOREIGN PATENT DOCUMENTS

JP          05228525 A    *  9/1993

OTHER PUBLICATIONS

First Office Action for related CN App No. 201810298000.2, 8 pgs.
(Continued)

*Primary Examiner* — Scott R Kastler
(74) *Attorney, Agent, or Firm* — Procopio, Cory, Hargreaves & Savitch LLP

(57) ABSTRACT

A side spray method for cooling a steel strip after hot rolling includes providing side spray devices behind multiple cooling sections on two sides in a width direction of a run out roller table of the steel strip after hot rolling. The side spray devices are staggered along the two sides of the run out roller table of the steel strip, the side spray devices include at least two spray units, each spray unit includes a spray tube and nozzles on the spray tube, the spray tubes being in parallel and vertically arranged along a running direction of the steel strip, and being movable along the running direction of the steel strip, covering ranges of the nozzles on the side spray devices are partially overlapped with each other, and a total spray coverage covering of nozzles covers a width of the run out roller table of the steel strip.

16 Claims, 3 Drawing Sheets

(51) Int. Cl.
*C21D 1/667* (2006.01)
*B21B 1/26* (2006.01)
*B21B 37/76* (2006.01)
*C21D 8/02* (2006.01)

(52) U.S. Cl.
CPC .............. *C21D 9/573* (2013.01); *B21B 1/26* (2013.01); *B21B 37/76* (2013.01); *B21B 2201/06* (2013.01); *C21D 8/0263* (2013.01)

(56) References Cited

OTHER PUBLICATIONS

First Search for related CN App No. 201810298000.2, 2 pgs.
Notification to Grant Patent Right for Invention for related CN App No. 201810298000.2, 3 pgs.
Supplementary Search for related CN App No. 201810298000.2, 1 pg.
Office Action for related KR App No. 10-2020-7023444 dated Apr. 15, 2021, 5 pgs.
Written Opinion for related PCT App No. PCT/CN2019/079325 dated Jun. 28, 2019, 2 pgs.
International Search Report for PCT App No. PCT/CN2019/079325 dated Jun. 28, 2019, 11 pgs. (partial translation).
First Office Action for related JP App No. 2020-543984, 7 pgs.
Extended European Search Report for related PCT App No. PCT/CN2019/079325 dated May 28, 2021, 7 pgs.

\* cited by examiner

SIDE SPRAY METHOD FOR COOLING THE STEEL STRIP AFTER HOT ROLLING

CROSS-REFERENCE TO RELATED APPLICATIONS

This application is a U.S. National Stage entry of PCT Application No: PCT/CN2019/079325 filed Mar. 22, 2019, which claims priority to Chinese Patent Application No. 201810298000.2 filed Mar. 30, 2018, the contents of which are incorporated herein by reference.

TECHNICAL FIELD

The present invention belongs to metallurgical technology and relates specifically to a side spray method for cooling the steel strip after hot rolling.

BACKGROUND ARTS

At present, the cooling area after hot continuous rolling generally uses a tilting frame type laminar cooling or a pressurized direct injection cooling device. The cooling water of each tilting frame falls on the upper surface of the steel strip in a disorderly flow state that is not effectively excluded, and form residual water on the surface resulting in uneven cooling. At the same time, due to the rapid movement of the steel strip, part of the cooling water will rush into the adjacent tipping rack area as the steel strip advances, destroying its cooling water state and resulting in poor cooling and uneven cooling. The cooling water will form a steam film when it encounters a high-temperature steel plate, hindering the direct contact of subsequent cooling water with the steel plate and affecting the cooling efficiency.

For this reason, the cooling area after hot continuous rolling is generally provided with a side spray device between the tilting frames to sweep off the residual water, and 1 to 2 cylindrical or fan-shaped nozzles are used for lateral spray perpendicular to the longitudinal running direction of the steel strip. The effect of removing water and breaking the steam film, but the following problems exist in the actual use process:

1) Side spray water splash causes adverse effects

Due to the fast movement speed of the steel strip, the impact force of the residual water on the surface is large. The lateral spray dewatering will inevitably cause a violent collision between the side spray water and the residual water, which will generate a large amount of splash water, especially near the area of the nozzle, the collision is more intense and the splash water is high and far that affects the surrounding environment. In addition, a large amount of splashing water can cause malfunctions of electrical equipment such as motors, making some production lines forced to stop or rarely turn on the side spray at the motor, resulting in uneven cooling on both sides of the steel strip. At the same time, the residual water with a certain impact force when sprayed laterally is easy to cross the water wall and enter the front of the strip, resulting in uneven cooling surface. Since baffles are provided on both sides of the cooling roller table, it will cause backsplash and backflow after the lateral water spray collides with the baffle. Especially for wide steel strip, the gap between the strip and the baffle is very small. It is difficult to remove the side spray water quickly. The backsplash and backflow to the surface of the steel strip not only affects the side spray effect, but also causes uneven cooling.

2) It is difficult to take into account the water removal effect of different width steel strips Lateral side spray, especially the lateral side spray of cylindrical nozzles, it is difficult to set an optimal contact point (spray point) between the spray water and the surface of the steel strip. There are many specifications of hot-rolled steel strips, and the wide and narrow steel strips bring great difficulty to the selection of spray points. The side spray points are very close to the side, and the narrow steel strip cannot be swept to the surface; the side spray points are very close to the middle, the edges of the broadband steel cannot be effectively purged. In addition, the cylindrical nozzle will also cause the area of the spray point to be too cold, making the widthwise cooling uneven.

Some production lines use sprays with close to zero degree angles, in order to take into account steel strips of different widths. The actual effect is not good.

For wider steel strips, it is different to sweep residual water out of the steel strip surface due to insufficient subsequent power of spraying water; for steel strip with bad shape and warping, the spraying water can not only sweeps the surface of the steel strip but also causes the steel strip to deviate.

For this reason, many technicians and scientific research institutes have optimized the side spray:

Chinese patent CN103611739A discloses an optimization calculation method of a hot rolling laminar flow side spray that calculates the preferred height and spray angle of the upper and lower nozzles on a plane perpendicular to the steel strip moving direction, uniformly covering the entire steel strip width and increasing the side spray purge effect. Although the side spray can cover the entire width, when the amount of residual water is large and the impact is strong, the lateral side spray is not very effective in removing water, and the side spray and the laminar water collide violently, which will causes a lot of splashes, and not only easy to cause peripheral electrical equipment failure, but also affects the surrounding environment.

Chinese patent CN203108954U discloses a side spray device of a steel plate cooling device. The utility model uses a high-pressure water nozzle and a high-pressure gas nozzle to sweep the residual water of the steel plate into the residual water suction system with negative pressure. The combination of high-pressure water and high-pressure gas can effectively remove residual water in the purging range. The negative pressure suction system can reduce the back wash and back flow if purge water to a certain extent. The utility model does not clarify the structure of the high-pressure water side spray device, so it is doubtful whether it can adapt to the purge of steel plates of different widths; the utility model adopts high-pressure water spray and gas spray, which will inevitably causes side water spray, gas and residual water to collide violently, generate a large amount of splash water, and it is difficult to enter the negative pressure water suction system completely, which will causes damage to surrounding electrical equipment and the environment; side spray devices need to be equipped with both air supply, water supply and water pumps that are too complex and expensive.

Chinese patent CN202591256U discloses a steel strip water removal nozzle device. The utility model adds at least one pair of side spray water removal nozzles between the precision cooling device and the temperature detector to eliminate the influence of residual water on temperature measurement. The patent only adds a pair of side nozzles in front of the thermometer, and does not solve the adverse effect of residual water on the cooling of the entire length of the cooling zone; adding side spray nozzles can effectively increase the water removal effect, but excessive temperature drop of side spray nozzles can adversely affect the cooling control of strip, and large amount of side spray splashes can also affect the electrical equipment and surrounding environment.

Chinese patent CN104525589A discloses a method for controlling the side spray of laminar cooling of hot-rolled steel strip. Level-2 process control system of laminar flow delivers the user-selected mode to level-1 basic automation control system of laminar cooling. A judgment process is set in the level-1 basic automation control system of laminar cooling to judge whether one or more laminar collecting devices in the laminar collecting device group are opened in the side spray opening mode. If yes, the side spray in the group is opened; otherwise, the side spray is still closed. This is the common open mode of laminar cooling in hot rolling.

Chinese patent CN205253744U discloses a hot-rolled laminar side water spray collecting device that can effectively collect side spray water and flow into the drainage ditch through the water guide groove and the pipe, without returning to the roller or rebounding back to the surface of the steel plate, optimizing the steel strip surface while protecting the surrounding electrical equipment. The rectangular collecting port of the device is too large without anti-collision design. When the head of the steel strip is deviated, it is easy to clamp into the collecting port, resulting in steel scrap.

Although the above patents have improved the original side spray effect to some extent, they cannot effectively solve the problem that the side spray water and the residual water violently collision with the splash caused by the lateral spray and affect the surrounding environment and electrical equipment. Some devices have security risks, and some devices are too complicated.

SUMMARY OF THE INVENTION

The purpose of the present invention is to provide a side spray method for cooling the steel strip after hot rolling, so as to minimize splash caused by intense collision between high pressure side spray water and residual water on the surface of the steel strip, and to improve the uniformity of cooling while avoiding adverse effects on the environment and electrical equipment.

For the above purposes, the technical scheme of the present invention is as follows:

Aside spray method for cooling the steel strip after hot rolling, comprising the following steps:

a) providing side spray devices behind multiple cooling sections on both sides of the run out roller table of the steel strip after hot rolling, wherein the side spray devices are staggered along the two sides of the run out roller table of the steel strip, the side spray devices include at least two spray units, each spray unit includes spray tube and nozzles on the tube, the spray tubes being in parallel and vertically arranged along the running direction of the steel strip, and being movable along the running direction of the steel strip; the covering ranges of the nozzles on the side spray devices are partially overlapped, and a total spray coverage of nozzles covers the width of the run out roller table of the steel strip; side spray water collecting devices are provided on the other side of the run out roller table of the steel strip that is opposite to side spray devices, so that side spray water being collected by the water collecting devices;

b) controlling the side spray devices in a mode of open-in-pairs, wherein multiple cooling sections and side spray devices are numbered in the running direction of the steel strip after hot rolling, when the valve at the cooling sections with odd number is opened, two consecutive staggered side spray devices behind the cooling sections are opened at the same time; when the valve at the cooling sections with even number is opened, the side spray device behind the cooling sections has been already open, and no further side spray device needs to be open.

Preferably, wherein when each side spray device has N spray units and N≥2, N spray units have N spray tubes, each spray tube is provided with one nozzle, and the width of the roller table of the steel strip is represented by Wg, the projection of each nozzle watermark along the width of the roller table is named as water spray coverage of nozzle Ws, formula Ws≥Wg/N is satisfied; and wherein the angle between the spray direction of the nozzle and the running direction of the steel strip is named as the direction angle α, and N nozzles on the side spray devices are sorted as 1~N along the running direction of the steel strip, the direction angle α from the first to the Nth nozzles is set as from large to small, and the direction angle α of the 1st to (N−1)th nozzles is from 110° to 165°, and the direction angle α of the Nth nozzle is from 75° to 105°.

Preferably, the nozzles on the side spray devices are sorted as 1~N along the running direction of the steel strip, and given the sequence number n, that is, n=1~N, and the direction angle of the nth nozzle is named as an, the watermark length of the nth nozzle on the surface of the steel strip $L_n$ satisfies $L_n=Ws/\sin(180°-α_n)$, and installation spacing $S_n$ between the (n+1)th nozzle and the nth nozzle satisfies $S_n=Ws/\tan(180°-α_n)-Ws/\tan(180°-α_{n+1})$; if the direction angle of the Nth nozzle $α_N<90°$, the installation spacing: $S_{N-1}=Ws/\tan(180°-αN-1)+Ws/\tan(α_N)$.

Preferably, the height h from the nozzle on the side spray device to the surface of the steel strip is set as 300-700 mm, and the nozzles on the side spray device are sorted in the running direction of the steel strip by 1~N, and the height of the first to the Nth nozzles is set from low to high.

Preferably, the nozzles on the side spray device are sorted by 1~N in the running direction of the steel strip, and given serial number n, that is, n=1~N, and the incident angle β satisfies the following:

1st nozzle's incident angle $β_1=90°$;

nth nozzle's incident angle $β_n=\arctan(h_n/((n-1)×L_n))$, wherein n>1, $h_n$ is the nth nozzle height, $L_n$ is the nth nozzle watermark length, nth nozzle's scattering angle $θ_n=\arctan((n×L_n)/h_n)-(90°-β_n)$, wherein n>0, $h_n$ is the nth nozzle height, $L_n$ is the watermark length, and $β_n$ is the incident angle.

Preferably, the side spray device has 2 to 5 spray units.

Preferably, the coverage of the nozzles on each side spray device has a certain overlap.

Preferably, the spray tube on the spray member is of a lifting design, so that the nozzle on the spray tube can be lifted up and down.

Preferably, the side spray water collecting device is a box body having an opening on one side that is corresponding to the side spray device, and at least two anti-collision arc plates are provided vertically on the opening side of the box body at intervals along the longitudinal direction, and the bottom plate of the box body is tilted, and provided with drainage hole.

Preferably, the opening side of the side spray water collecting device box body is provided with vertical anti-collision arc plates at both sides, respectively.

Preferably, the nozzle on the spray member is rotatable, and can rotate up, down, left and right.

Preferably, the side spray device includes, water collecting pipe, connecting with water source through pipeline;

at least two spray units with nozzles, where the spray tubes on the spray units are vertically arranged along the longitudinal direction of the water collecting pipe, and are movably connected to the fixed bracket through connecting piece, respectively, and are connected to the water collecting pipe through a hose, the spray tubes are adjustable for spacing, height and angle.

Preferably, the spray tubes on the side spray device are supplied with water through a water collecting pipe or separate water inlet, and the water pressure and flow rate are controlled independently.

Preferably, the water supply pressure of the water collecting pipe of the side spray device is 1.0 MPa to 2.0 MPa, and the flow rate is 10 $m^3/h$ to 20 $m^3/h$.

Preferably, the spray unit is provided with an adjustable ball joint for adjusting the nozzle incident angle, i.e., the nozzle forward inclination angle, and the nozzle is connected to the ball joint.

Preferably, the nozzle is a fan nozzle or a tongue nozzle.

The present invention minimizes splash caused by intense collision between high pressure side spray water and residual water on the surface of the steel strip by designing a guided water-jet side spray device, while breaking the steam film on the surface of the steel strip. The residual water on the surface of the steel strip can be swept into the collecting device by using the water fall of three-dimensional curved surface, which can be used for different width of the steel strip, and introduced into the drainage ditch to prevent backsplash and backflow to the surface of roller table and steel strip, so as to improve the uniformity of cooling. The anti-collision design of side spray water collecting device not only protects the device but also prevents the end of steel strip from being stuck in steel scrap. Uniform cooling can be achieved by side spray devices in a mode of open-in-pairs.

The side spray device is alternately installed on both sides of the cooling roller table, and consists of 2-5 spray units with adjustable spacing, height, spray angle and spray direction. Each spray unit consists of a spray tube, an adjustable ball joint and a nozzle, and sprays a water-jet with both a striking force and a covering surface to form a three-dimensional guide curved water wall covering the entire width of the roller table. While removing residual water on the surface and reducing splash water, it can be applied to steel strip of different size width.

The nozzle can be a fan nozzle or a tongue nozzle, preferably a tongue nozzle. The tongue nozzle adopts the structure of reflector, the width of spray watermark of nozzle is narrower, water flow is more concentrated, the impact force is bigger. It can not only break the steam film to sweep the residual water, but also have larger coverage to block the residual water splash.

Determine the distance between the nozzle and the surface of the steel strip to proper height h. If the height is too high, the impact force is insufficient, and if the height is too low, the water wall is too low to form an effective barrier. The height h is designed as 300-700 mm. In order to maintain a certain height of the water wall in the entire width direction, the height of the n (n=1~N) nozzles of the steel strip are designed from low to high.

The side water spray collecting device has two main functions, one is to prevent the backsplash and backflow of the side spray water, and the other is to collect the side spray water and discharge it into the drain. As shown FIG. 3, a semi-enclosed space is formed by tilted guide plate, water collecting base plate, drainage hole, side cover plate, top cover plate and rear cover plate. The side spray water enters the side spray water collecting device and flows into the drainage ditch through the drainage port.

The head of steel strip is easy to run against both sides of the cooling roller table, if it is clamped into the side spray water collecting device resulting in steel scrap, an anti-collision arc plate is provided on the inlet side of the side spray water collecting device. The arc plate helps the steel plate to rebound or slide after impact, and does not cause steel scrap. The impact force of high-speed running steel strip is large, in order to protect side spray water collecting device, anti-collision arc plate is fixed on side spray water collecting device by reinforcing rib.

The side spray water collecting device is installed on the opposite side of the downstream side of the side spray device, considering that the side spray is blown out of the surface of the steel strip and there will be a certain degree of oblique splashing due to inertia.

Although the watermark of the side spray device is basically uniform cover the width of roll table, considering that the residual water of the strip surface is disordered flowing, and the moving speed of the strip is faster, the uncertainties of the water state of the strip surface after side-spray are greater. In order to ensure cooling uniformity on the width direction, the side spray devices are designed as the staggered arrangement on both sides of the run out roller table and in a mode of open-in-pairs.

Beneficial Effects of the Invention

The present invention minimizes splash caused by intense collision between high pressure side spray water and residual water on the surface of the steel strip by using a guided water-jet side spray device and side spray water collecting device. While breaking the steam film on the surface of the steel strip, the residual water on the surface of the steel strip can be swept into the collecting device by using the water fall of three-dimensional curved surface, which can be used for different width of the steel strip, and introduced into the drainage ditch to prevent backsplash and backflow to the roller table and surface of steel strip, so as to improve the uniformity of cooling. The anti-collision design of side spray collecting device not only protects the collecting device but also prevents the end of steel strip from being stuck in steel scrap. Uniform cooling can be achieved by side spray devices in staggered arrangement and in a mode of open-in-pairs.

FIGURE DESCRIPTION

Figure 4:
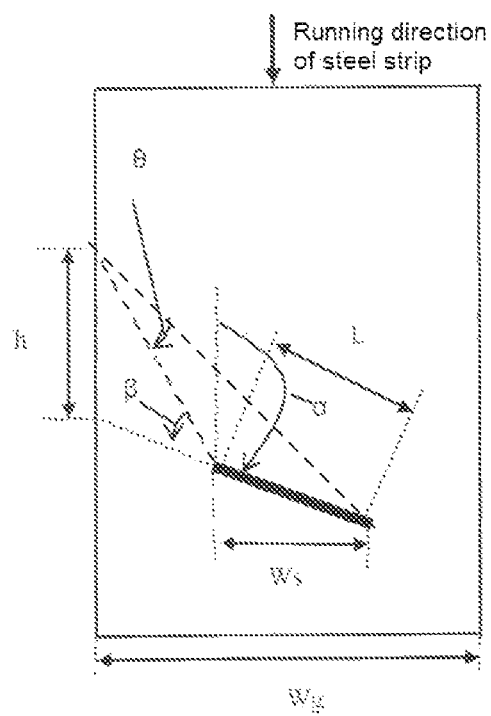

FIG. 4 is a schematic diagram of a single nozzle side spray of the present invention. In-picture marking: α-direction angle; β-incident angle; θ-scattering angle; h-height of nozzle from nozzle; L-watermark length; Ws-water spray coverage of the side spray; Wg-width of the roller table.

Figure 5:
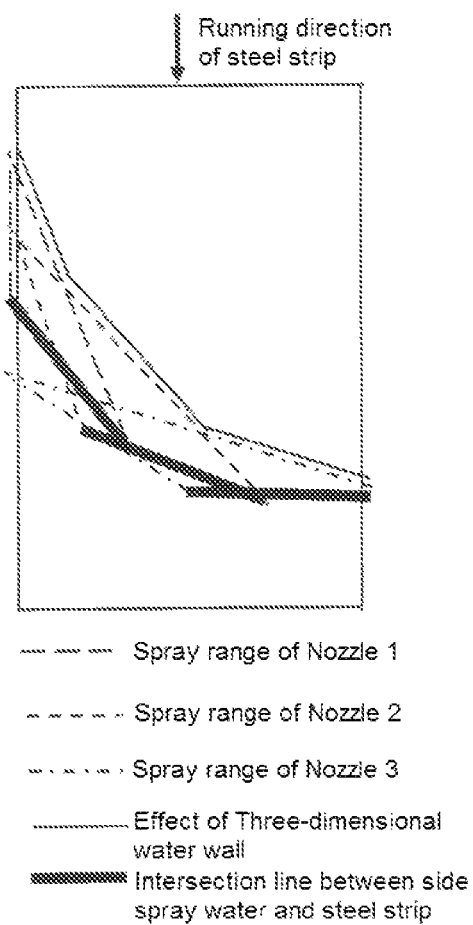

FIG. 5 is a schematic diagram of the effect of the guided side spray of the present invention.

DETAILED DESCRIPTION

As shown FIG. 1-FIG. 5, the side spray method for cooling the steel strip after hot cooling, comprising the following steps:
a) providing side spray devices 30, 30', 30" behind multiple cooling sections 20, 20', 20" on both sides of run out roller table 10 of the steel strip after hot rolling, wherein the side spray devices 30, 30', 30" are staggered along the two sides of run out roller table 10 of the steel strip, the side spray devices include at least two spray units along the running direction of the steel strip, each spray unit includes spray tube and nozzles on the tube, one of the nozzles can be fixed and the other nozzles being movable along the running direction of the steel strip; the covering ranges of the nozzles on the side spray devices are partially overlapped, and a total spray coverage covering of the nozzles covers the width of the steel strip roller table; side spray water collecting devices 30, 30', 30" are provided on the other side of run out roller table 10 of the steel strip that is opposite to side spray devices 40, 40', 40", so that side spray water being collected by the water collecting devices 40, 40', 40";
b) controlling the side spray devices 30, 30', 30" in a mode of open-in-pairs, wherein multiple cooling sections and side spray devices are numbered in the running direction of the steel strip after hot rolling, when the valve at the cooling sections with odd number is opened, the valves of two consecutive staggered side spray devices behind the cooling sections are opened at the same time; when the valve at the cooling sections with even number is opened, the side spray device behind the cooling sections has been already open, and no further side spray device needs to be open.

Figure 3:
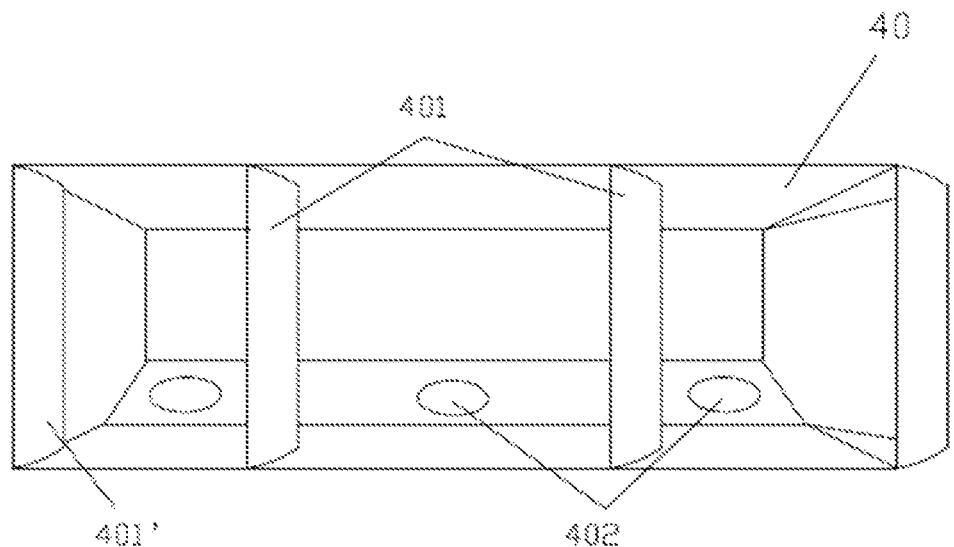
FIG. 3 is a schematic diagram of the side spray water collecting device of the present invention.

As shown FIG. 3, the side spray water collecting device 40 of the present invention is a box body having an opening on one side that is corresponding to the side spray device, and at least two anti-collision arc plates 401 are provided vertically on the opening side of the box body at intervals along the longitudinal direction, and the bottom plate of the box body is tilted, and provided with drainage hole 402.

Preferably, the opening side of the box body is provided with vertical anti-collision arc plates 401' at both sides, respectively.

Preferably, the nozzle on the spray member is rotatable, and can rotate up, down, left and right.

Figure 1:
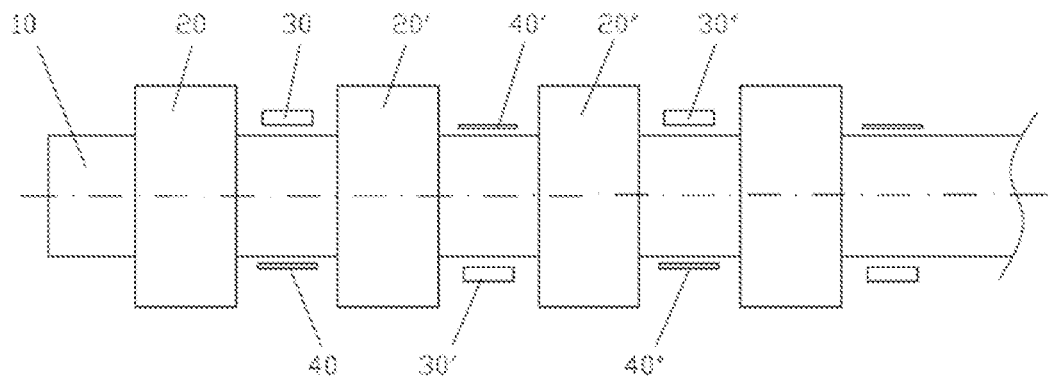
FIG. 1 is a schematic diagram of the cooling arrangement of the hot-rolled steel strip after rolling of the present invention.
Figure 2:
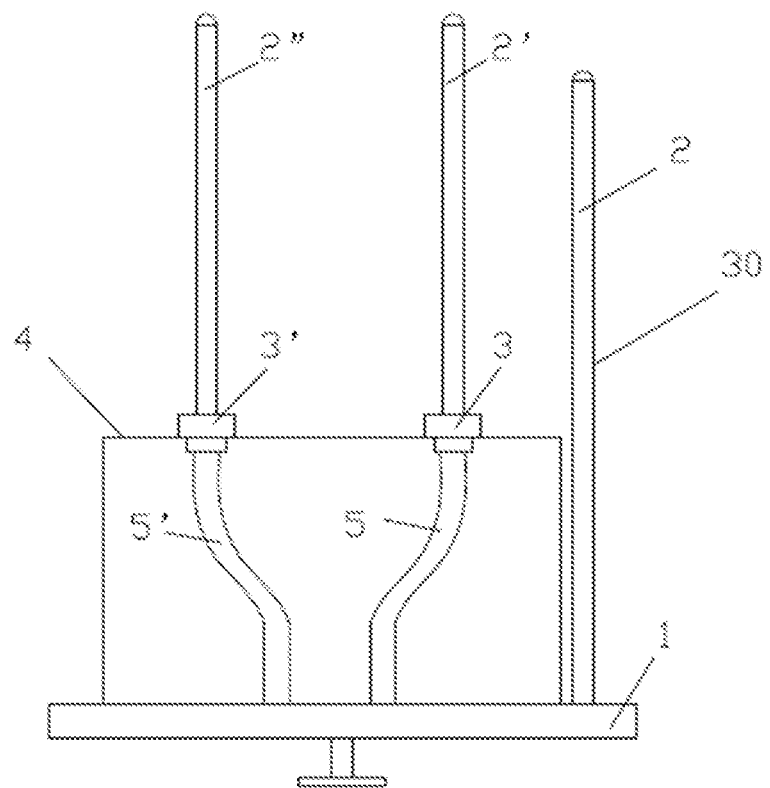
FIG. 2 is a schematic structural diagram of the side spray device of the present invention.

As shown FIG. 2, the side spray devices 30 (take side spray device 30 as example, the same below) of the present invention comprising, Water collecting pipe 1, connecting with water source through pipeline;

Three spray tubes 2, 2', 2" with nozzles are vertically arranged along the length of the water collection pipe 1, one of spray tube 2 is fixed and connected to the water collecting pipe 1; spray tubes 2', 2" are movably connected to the fixed bracket 4 through connecting pieces 3, 3', respectively, the spray tubes 2', 2" are adjustable for spacing, height and angle, and connected to the water collecting pipe 1 through hoses 5, 5'.

Preferably, the spray tubes on the side spray device are supplied with water through a water collecting pipe or separate water inlet, and the water pressure and flow rate are controlled independently.

Preferably, the water supply pressure of the water collecting pipe of the side spray device is 1.0 MPa to 2.0 MPa, and the flow rate is 10 $m^3/h$ to 20 $m^3/h$.

Preferably, the spray unit is provided with an adjustable ball joint for adjusting the nozzle incident angle, i.e., the nozzle forward inclination angle, and the nozzle is connected to the ball joint.

Preferably, the nozzle is a fan nozzle or a tongue nozzle.

As shown FIG. 4, the spray direction of the nozzle and the running direction of the steel strip is recorded as the direction angle α, can be adjusted by turning the ball joint left and right rotation; the angle formed by the water spray of the nozzle near the side spray device and the steel plate is the incident angle β, can be adjusted by turning the ball joint left and right rotation and the nozzle up and down; the scattering angle θ is the inherent characteristic of the nozzle, which is shaped according to the design angle. By changing the direction angle and the incident angle, the watermark length L and the water spray coverage of the side spray Ws can be adjusted so that the side spray water covers the entire width of the roller table Wg.

As shown FIG. 5, under the barrier and guidance of the three-dimensional water wall formed by the nozzles 1 and 2, the residual water on the steel strip surface flows to the other side of the roller table, and finally leave the steel strip surface under the guidance and impact of the nozzle 3 to enter the side spray water collecting device.

Example 1

The width of the roller table can be a variety of widths, such as 1050 mm, 1250 mm, 1350 mm, 1450 mm, 1580 mm, 1700 mm, 1800 mm, 1880 mm, 2050 mm, 2250 mm, 2300 mm, but not limited thereto.

Take a width of the roller table with 1800 mm cooling zone of hot-rolling line as an example.
(1) The side spray device is designed with three side spray tubes, that is three nozzles, each nozzle should cover at least the roller table range on the width direction Ws=1800 mm/3=600 mm.
(2) According to the principle of guided side spray, the 1st nozzle's direction angle is set to 150°, and the watermark length on the surface of the steel strip is $L_1$:
$L_1$=600/sin(180°−150°)=1200 mm,
2nd nozzle's direction angle is set to 135°, and the distance to 1st nozzle is $S_1$:
$S_1$=600/tan(180°−150°)−600/tan(180°−135°)=439 mm,
Watermark length $L_2$ of 2nd nozzle on the steel strip surface:
$L_2$=600/sin(180°−135°)=848.5 mm,
3rd nozzle mainly plays a strong sweeping function, the direction angle is set to 90°, and the distance to 2nd nozzle is $S_2$:
$S_2$=600/tan(180°−135°)−0=600 mm,
Watermark length $L_3$ of 3rd nozzle on the steel strip surface:
$L_3$=600/sin(180°−90°)=600 mm
Total spacing S between three nozzles:
S=$S_1$+$S_2$=439+600=1039 mm,
There are three rollers' spacing between the two cooling sections of the cooling roller table. The single roller's spacing is 360 mm and the total length is 360 mm×3=1080 mm. It is just right to install the side spray device. If the spacing between the cooling sections is insufficient to install, the direction angle can be adjusted appropriately to shorten the spacing between nozzles.

(3) The distance from the nozzle to the steel strip surface is set to $h_1=400$ mm, $h_2=500$ mm, $h_3=600$ mm.

(4) According to the height h of the side nozzle and the watermark length L, the incident angle of each side nozzle is determined:

1st nozzle's incident angle $\beta_1=90°$

2nd nozzle's incident angle $\beta_2=\arctan(h_2/(2-1)\times L_2))=\arctan(500/848.5)=30.5°$ 3rd nozzle's incident angle $\beta_3=\arctan(h_3/((3-1)\times L_3))=\arctan(600/1200)=26.6°$ (5) According to the height h of the side nozzle, the watermark length L and the incident angle $\beta$, the scattering angle $\theta$ of each side nozzle is determined:

1st nozzle's scattering angle $\theta_1=\arctan(L_1/h_1)-(90°-\beta_1)=\arctan(1200/400)=71.6°$ 2nd nozzle's scattering angle $\theta_2=\arctan(2\times L_2/h_2)-(90°-\beta_2)=\arctan(2\times 848.5/500)-(90°-30.5°)=14.1°$ 3rd nozzle's scattering angle $\theta_3=\arctan(3\times L_3/h_3)-(90°-\beta_3)=\arctan(3\times 600/600)-(90°-26.6°)=8.2°$.

In order to improve the water blocking and dewatering effect, the watermark of each nozzle should have a certain overlap, so the calculation results should be optimized with appropriately increasing the incident angle and the scattering angle.

2nd nozzle's incident angle $\beta_2=35°$

3rd nozzle's incident angle $\beta_3=30°$

2nd nozzle's scattering angle $\theta_2=\arctan(848.5\times 2/500)-(90°-35°)=18.6°$ 3rd nozzle's scattering angle $\theta_3=\arctan(600\times 3/600)-(90°-30°)=11.6°$.

Example 2

Take a width of the roller table with 1050 mm cooling zone of hot-rolling line as an example.

(1) The side spray device is designed with three side spray tubes, that is three nozzles, each nozzle should cover at least the roller table range on the width direction $Ws=1050$ mm/3=350 mm.

(2) According to the principle of guided side spray, 1st nozzle's direction angle is set to 165°, and the watermark length on the surface of the steel strip is $L_1$:

$L_1=350/\sin(180°-165°)=1352$ mm,

2nd nozzle's direction angle is set to 150°, and the distance to 1st nozzle is $S_1$:

$S_1=350/\tan(180°-165°)-350/\tan(180°-150°)=700$ mm,

Watermark length $L_2$ of 2nd nozzle on the steel strip surface:

$L_2=350/\sin(180°-150°)=700$ mm,

3rd nozzle mainly plays a strong sweeping function, the direction angle is set to 105°, and the distance to 2nd nozzle is $S_2$:

$S_2=350/\tan(180°-150°)-350/\tan(180°-105°)=512$ mm,

Watermark length $L_3$ of 3rd nozzle on the steel strip surface:

$L_3=350/\sin(180°-105°)=362$ mm

Total spacing S between three nozzles:

$S=S_1+S_2=700+512=1212$ mm,

There are three rollers' spacing between the two cooling sections of the cooling roller table. The single roller's spacing is 420 mm and the total length is 420 mm×3=1260 mm. It is just right to install the side spray device. If the spacing between the cooling sections is insufficient to install, the direction angle can be adjusted appropriately to shorten the spacing between nozzles.

(3) The distance from the nozzle to the steel strip surface is set to $h_1=400$ mm, $h_2=500$ mm, $h_3=600$ mm.

(4) According to the height h of the side nozzle and the watermark length L, the incident angle of each side nozzle is determined:

1st nozzle's incident angle $\beta_1=90°$

2nd nozzle's incident angle $\beta_2=\arctan(h_2/(2-1)\times L_2))=\arctan(500/700)=35.5°$ 3rd nozzle's incident angle $\beta_3=\arctan(h_3/((3-1)\times L_3))=\arctan(600/724)=39.6°$.

(5) According to the height h of the side nozzle, the watermark length L and the incident angle $\beta$, the scattering angle $\theta$ of each side nozzle is determined:

1st nozzle's scattering angle $\theta_1=\arctan(L_1/h_1)-(90°-\beta_1)=\arctan(1352/400)=73.5°$ 2nd nozzle's scattering angle $\theta_2=\arctan(2\times L_2/h_2)-(90°-\beta_2)=\arctan(2\times 700/500)-(90°35.5°)=15.8°$ 3rd nozzle's scattering angle $\theta_3=\arctan(3\times L_3/h_3)-(90°-\beta_3)=\arctan(3\times 362/600)-(90°-33.7°)=10.7°$.

In order to improve the water blocking and dewatering effect, the watermark of each nozzle should have a certain overlap, so the calculation results should be optimized with appropriately increasing the incident angle and the scattering angle.

2nd nozzle's incident angle $\beta_2=40°$

3rd nozzle's incident angle $\beta_3=45°$

2nd nozzle's scattering angle $\theta_2=\arctan(700\times 2/500)-(90°40°)=20.3°$ 3rd nozzle's scattering angle $\theta_3=\arctan(362\times 3/600)-(90°45°)=16.1°$.

Example 3

Take a width of the roller table with 2250 mm cooling zone of hot-rolling line as an example.

(1) The side spray device is designed with three side spray tubes, that is three nozzles, each nozzle should cover at least the roller table range on the width direction $Ws=2250$ mm/3=750 mm.

(2) According to the principle of guided side spray, 1st nozzle's direction angle is set to 135°, and the watermark length on the surface of the steel strip is $L_1$:

$L_1=750/\sin(180°-135°)=1061$ mm;

2nd nozzle's direction angle is set to 110°, and the distance to 1st nozzle is $S_1$:

$S_1=750/\tan(180°-135°)-750/\tan(180°-110°)=477$ mm,

Watermark length $L_2$ of 2nd nozzle on the steel strip surface:

$L_2=750/\sin(180°-110°)=798$ mm,

3rd nozzle mainly plays a strong sweeping function, the direction angle is set to 75°, and the distance to 2nd nozzle is $S_2$:

$S_2=750/\tan(180°-110°)+750/\tan(75°)=474$ mm,

Watermark length $L_3$ of the 3rd nozzle on the steel strip surface:

$L_3=750/\sin(180°-105°)=776$ mm

Total spacing S between three nozzles:

$S=S_1+S_2=477+474=951$ mm,

There are three rollers' spacing between the two cooling sections of the cooling roller table. The single roller's spacing is 360 mm and the total length is 360 mm×3=1080 mm. It is just right to install the side spray device. If the spacing between the cooling sections is insufficient to install, the direction angle can be adjusted appropriately to shorten the spacing between nozzles.

(3) The distance from the nozzle to the steel strip surface is set to $h_1=400$ mm, $h_2=500$ mm, $h_3=600$ mm.

(4) According to the height h of the side nozzle and the watermark length L, the incident angle of each side nozzle is determined:

1st nozzle's incident angle $\beta_1=90°$

2nd nozzle's incident angle $\beta_2=\arctan(h_2/(2-1)\times L_2))=\arctan(500/798)=32.1°$ 3rd nozzle's incident angle $\beta_3=\arctan(h_3/((3-1)\times L_3))=\arctan(600/776)=37.7°$.

(5) According to the height h of the side nozzle, the watermark length L and the incident angle β, the scattering angle θ of each side nozzle is determined:

1st nozzle's scattering angle $\theta_1=\arctan(L_1/h_1)-(90°-\beta_1)=\arctan(1061/400)=69.3°$ 2nd nozzle's scattering angle $\theta_2=\arctan(2\times L_2/h_2)-(90°-\beta_2)=\arctan(2\times798/500)-(90°32.1°)=14.7°$ 3rd nozzle's scattering angle $\theta_2=\arctan(3\times L_3/h_3)-(90°-\beta_3)=\arctan(3\times776/600)-(90°-37.7°)=23.2°$.

In order to improve the water blocking and dewatering effect, the watermark of each nozzle should have a certain degree of overlap, so the calculation results should be optimized with appropriately increasing the incident angle and the scattering angle.

2nd nozzle's incident angle $\beta_2=35°$

3rd nozzle's incident angle $\beta_3=40°$

2nd nozzle's scattering angle $\theta_2=\arctan(798\times2/500)-(90°35°)=17.6°$

3rd nozzle's scattering angle $\theta_3=\arctan(776\times3/600)-(90°-40°)=25.5°$.

A high-to-low three-dimensional water wall from one side of the side spray device to the other side of the roller table is formed by nozzle 1 and nozzle 2, which effectively blocks the residual water on the surface of the steel strip; and the side spray water has a lateral impact force, which can guide the residual water on the blocked surface of the steel strip to the other side of the roller table. These guided water flows will not only drive the more distant residual water to the other side of the roller table, but also suppress its splash; when the residual water on the surface of the steel strip is blocked by the three-dimensional water wall and guided to the other side near the roller table, it quickly leaves the surface of the steel strip under the strong impact and guidance of the nozzle 3 and enters the side spray water collecting device, because the impact point of the nozzle 3 and the residual water is close to the other side of the roller table, so it will not cause much splash. Therefore, the entire set of side spray devices can not only effectively sweep the residual water on the surface of the steel strip, but also reduce splashing.

The above is the static calculation and optimization results. In actual application, due to the difference in the water volume of the cooling device and the change in the steel strip speed, it is necessary to adjust online based on the actual side spray effect based on the above design to adapt to the actual working conditions.

The invention claimed is:

1. A side spray method for cooling a steel strip after hot rolling, the side spray method comprising:

a) providing side spray devices behind multiple cooling sections on two sides in a width direction of a run out roller table of the steel strip after hot rolling, wherein the side spray devices are staggered along the two sides of the run out roller table of the steel strip, the side spray devices include at least two spray units, each spray unit includes a spray tube and nozzles on the spray tube, the spray tubes being in parallel and vertically arranged along a running direction of the steel strip, and being movable along the running direction of the steel strip, covering ranges of the nozzles on the side spray devices are partially overlapped with each other, and a total spray coverage covering of nozzles covers a width of the run out roller table of the steel strip, side spray water collecting devices being provided on an other side of the run out roller table of the steel strip that is opposite to side spray devices, so that side spray water being collected by the water collecting devices; and b) controlling the side spray devices in a mode of open-in-pairs, wherein the cooling sections and side spray devices are numbered in the running direction of the steel strip after hot rolling such that each of the cooling sections is numbered as an odd number or an even number in the running direction of the steel strip after hot rolling, when a valve at the cooling sections with the odd number is opened, two consecutive staggered side spray devices behind the cooling sections are opened at a same time, and when the valve at the cooling sections with the even number is opened, the side spray device behind the cooling sections has been already open, and no further side spray device needs to be open.

2. The side spray method for cooling the steel strip after hot rolling according to claim 1, wherein, when each side spray device has N spray units and N≥2, N spray units have N spray tubes, each spray tube is provided with one nozzle, and the width of the roller table of the steel strip is represented by Wg, a projection of each nozzle along the width of the roller table is named as water spray coverage of nozzle Ws, formula Ws≥Wg/N is satisfied, and wherein an angle between a spray direction of the nozzle and the running direction of the steel strip is named as direction angle α, and N nozzles on the side spray devices are designated as 1~N along the running direction of the steel strip, the direction angle α from a first to Nth nozzles is set as from large to small, and the direction angle α of the 1st to (N−1)th nozzles is from 110° to 165°, and the direction angle α of the Nth nozzle is from 75° to 105°.

3. The side spray method for cooling the steel strip after hot rolling according to claim 1, wherein the nozzles on the side spray devices are designated as 1~N along the running direction of the steel strip, and given a sequence number n, that is, n=1~N, and a direction angle of the Nth nozzle is named as $\alpha_n$, length of water spray coverage of an Nth nozzle on a surface of the steel strip is $L_n$ satisfies $L_n=Ws/\sin(180°-\alpha_n)$, and installation spacing $S_n$ between an (N+1)th nozzle and the Nth nozzle satisfies $S_n=Ws/\tan(180°-\alpha_n)-Ws/\tan(180°-\alpha_{n+1})$ when the direction angle of the Nth nozzle $\alpha_N<90°$, the installation spacing: $S_{N-1}=Ws/\tan(180°-\alpha_{N-1})+Ws/\tan(\alpha_N)$.

4. The side spray method for cooling the steel strip after hot rolling according to claim 1, wherein a height h from the nozzle on the side spray device to a surface of the steel strip is set as 300~700 mm, and the nozzles on the side spray device are designated in the running direction of the steel strip by 1~N, and the height of the first to the Nth nozzles is set from low to high.

5. The side spray method for cooling the steel strip after hot rolling according to claim 1, wherein the nozzles on the side spray device are designated by 1~N in the running direction of the steel strip, and given serial number n, that is, n=1~N, and an incident angle R satisfies:

1st nozzle's incident angle $\beta_1=90°$;

nth nozzle's incident angle $\beta_n=\arctan(h_n/((n-1)\times L_n))$, wherein n>1, $h_n$ is an nth nozzle height and $L_n$ is nth nozzle water spray coverage length, nth nozzle's scattering angle $\theta_n=\arctan((n\times L_n)/h_n)-(90°-\beta_n)$, wherein n>0, $h_n$ is the nth nozzle height, $L_n$ is the water spray coverage length and $\beta_n$ is the incident angle.

6. The side spray method for cooling the steel strip after hot rolling according to claim 1, wherein the side spray device has 2 to 5 spray units.

7. The side spray method for cooling the steel strip after hot rolling according to claim 1, wherein the coverage of the nozzles on each side spray device has a certain overlap.

8. The side spray method for cooling the steel strip after hot rolling according to claim 1, wherein the spray tube on a spray member is of a lifting design, so that the nozzle on the spray tube can be lifted up and down.

9. The side spray method for cooling the steel strip after hot rolling according to claim 1, wherein the side spray water collecting device is a box body having an opening on one side that is corresponding to the side spray device, and at least two anti-collision arc plates are provided vertically on an opening side of the box body at intervals along a longitudinal direction, and a bottom plate of the box body is tilted, and provided with drainage hole.

10. The side spray method for cooling the steel strip after hot rolling according to claim 9, wherein an opening side of the side spray water collecting device box body is provided with vertical anti-collision arc plates at both sides, respectively.

11. The side spray method for cooling the steel strip after hot rolling according to claim 1, wherein the nozzle on a spray member is rotatable, and can rotate up, down, left and right.

12. The side spray method for cooling the steel strip after hot rolling according to claim 1, wherein the side spray device includes:

water collecting pipe, connecting with water source through pipeline; and at least two spray units with nozzles, where the spray tubes on the spray units are vertically arranged along a longitudinal direction of the water collecting pipe, and are movably connected to a fixed bracket through connecting piece, respectively, and are connected to the water collecting pipe through a hose, the spray tubes are adjustable for spacing, height and angle.

13. The side spray method for cooling the steel strip after hot rolling according to claim 12, wherein the spray tubes on the side spray device are supplied with water through a water collecting pipe or a separate water inlet, and a water pressure and a flow rate are controlled independently.

14. The side spray method for cooling the steel strip after hot rolling according to claim 12, wherein the water pressure of the water collecting pipe of the side spray device is 1.0 MPa to 2.0 MPa, and the flow rate is 10 m³/h to 20 m³/h.

15. The side spray method for cooling the steel strip after hot rolling according to claim 12, wherein the spray unit is provided with an adjustable ball joint for adjusting a nozzle incident angle, including a nozzle forward inclination angle, and wherein the nozzle is connected to the ball joint.

16. The side spray method for cooling the steel strip after hot rolling according to any claim 1, wherein the nozzle is a fan nozzle or a tongue nozzle.

\* \* \* \* \*